(12) United States Patent
Jovenall et al.

(10) Patent No.: US 11,158,205 B2
(45) Date of Patent: **\*Oct. 26, 2021**

(54) SYSTEMS, METHODS AND DEVICES FOR REMOTE CONTROL LOCOMOTIVE TRAINING

(71) Applicant: Cattron North America, Inc., Warren, OH (US)

(72) Inventors: Jeremy Jovenall, Mercer, PA (US); André Brousseau, Quebec (CA)

(73) Assignee: Cattron North America, Inc., Warren, OH (US)

( * ) Notice: Subject to any disclaimer, the term of this patent is extended or adjusted under 35 U.S.C. 154(b) by 152 days.

This patent is subject to a terminal disclaimer.

(21) Appl. No.: 16/791,096

(22) Filed: Feb. 14, 2020

(65) Prior Publication Data
US 2020/0184840 A1  Jun. 11, 2020

Related U.S. Application Data

(63) Continuation of application No. 15/872,624, filed on Jan. 16, 2018, now Pat. No. 10,593,226.

(60) Provisional application No. 62/611,374, filed on Dec. 28, 2017.

(51) Int. Cl.
| | |
|---|---|
| *G09B 9/04* | (2006.01) |
| *B60T 13/66* | (2006.01) |
| *B60T 17/22* | (2006.01) |
| *B61C 17/12* | (2006.01) |
| *B60T 7/18* | (2006.01) |
| *B60T 7/16* | (2006.01) |
| *B60T 8/17* | (2006.01) |

(52) U.S. Cl.
CPC ............... *G09B 9/04* (2013.01); *B60T 7/16* (2013.01); *B60T 7/18* (2013.01); *B60T 8/1705* (2013.01); *B60T 13/665* (2013.01); *B60T 17/228* (2013.01); *B61C 17/12* (2013.01)

(58) Field of Classification Search
CPC ....... B60T 13/665; B60T 17/228; B61C 17/12
USPC ........................................................ 701/19
See application file for complete search history.

(56) References Cited

FOREIGN PATENT DOCUMENTS

RU  2527936 C2  9/2014

*Primary Examiner* — Maceeh Anwari
(74) *Attorney, Agent, or Firm* — Harness, Dickey & Pierce, PLC; Anthony G. Fussner

(57) ABSTRACT

According to various aspects, exemplary embodiments are disclosed of systems, methods and devices related to remote control locomotive training. In an exemplary embodiment, a remote control locomotive training system includes a locomotive control unit coupled to a locomotive and configured to control operation of the locomotive, and a trainee operator control unit in wireless communication with the locomotive control unit. The trainee operator control unit includes a first wireless interface to transmit one or more commands to the locomotive control unit. The system also includes a trainer operator control unit in wireless communication with the trainee operator control unit via a second wireless interface. The trainer operator control unit is configured to monitor the trainee operator control unit by receiving messages from the trainee operator control unit indicative of the one or more commands transmitted from the trainee operator control unit to the locomotive control unit.

20 Claims, 3 Drawing Sheets

SYSTEMS, METHODS AND DEVICES FOR REMOTE CONTROL LOCOMOTIVE TRAINING

CROSS-REFERENCE TO RELATED APPLICATIONS

This application is a continuation of allowed U.S. patent application Ser. No. 15/872,624 filed Jan. 16, 2018 (published as US2019/0206274 on Jul. 4, 2019), which, in turn, claims the benefit of and priority to U.S. Provisional Application No. 62/611,374 filed Dec. 28, 2017. The entire disclosures of the above applications are incorporated herein by reference.

FIELD

The present disclosure generally relates to systems, methods and devices for remote control locomotive training.

BACKGROUND

This section provides background information related to the present disclosure which is not necessarily prior art.

In the remote control locomotive (RCL) industry, significant training is involved in initial certification and periodic recertification. An RCL system is not able to support more than two handheld operator control units (OCUs) at one time due to industry rules. This training requires that a trainer and a trainee work together in the rail yard. It is typical for a two-person crew to operate a single locomotive.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings

DETAILED DESCRIPTION

Figure 1:
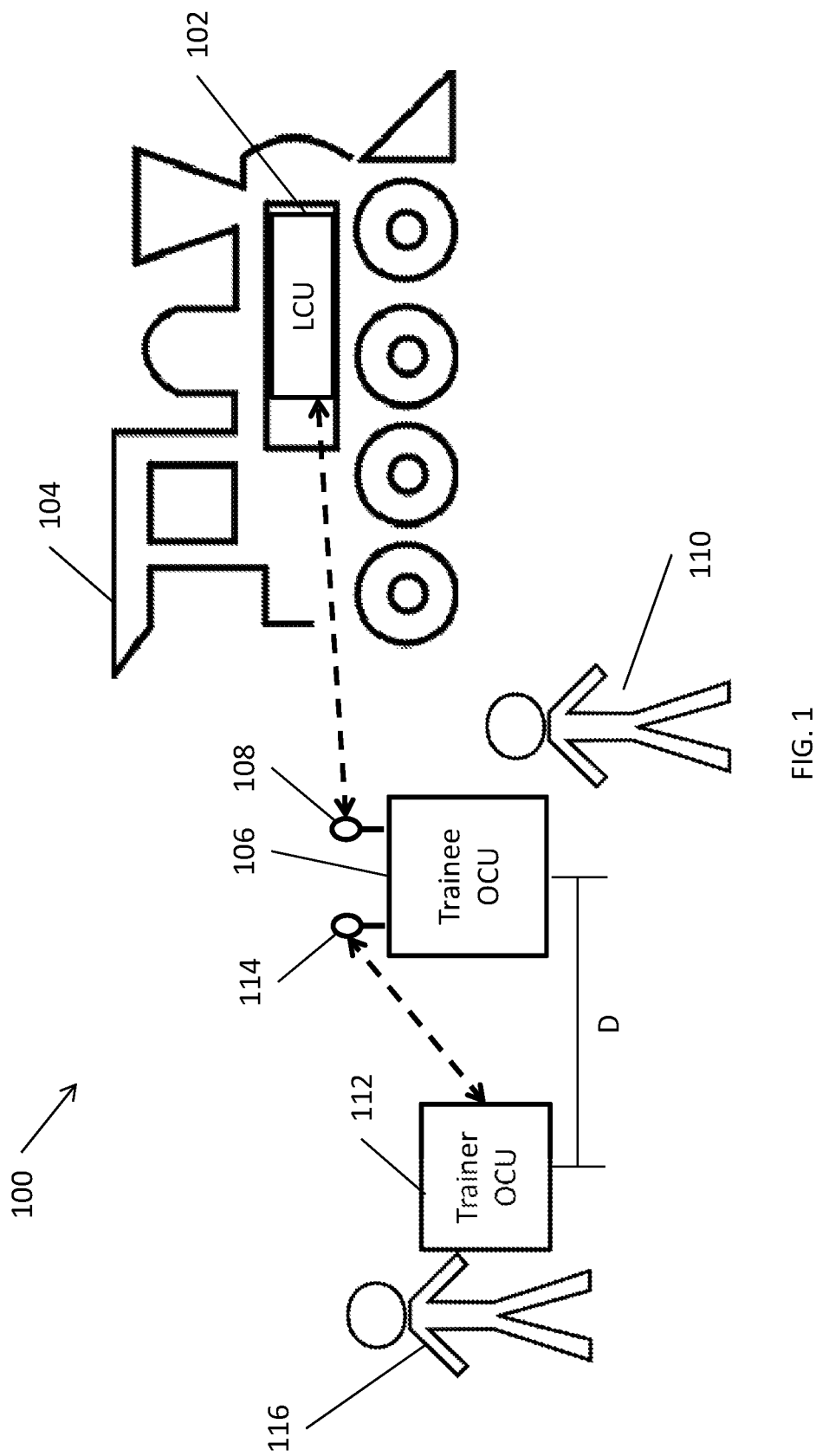
FIG. 1 is a block diagram of a remote control locomotive training system according to one example embodiment of the present disclosure.

Example embodiments will now be described more fully with reference to the accompanying drawings.

The inventors have recognized that in current methods of remote control locomotive (RCL) training, the trainer shadows the trainee and relies on observations and two-way radio communication to control the RCL system if the trainee is not following rules or performing unsafe actions with the locomotive. In some cases, the trainer cannot directly observe the actions of the trainee when they are riding on opposite sides of a locomotive car.

Disclosed herein are exemplary embodiments of systems, methods and devices for RCL training. In some embodiments, a trainer operator control unit (OCU) can view feedback (e.g., talkback) messages from the locomotive that is being used for training. The trainer OCU may view switch settings of the trainer OCU controlling the locomotive used for training. In some cases, the trainer OCU can only monitor one trainer OCU at a time.

The trainer OCU may be able to command an emergency brake application (e.g., through an independent brake override, a tilt timeout, etc.), but may not be able to override any other commands from the trainer OCU that it is supervising. The system may command a full brake application if the trainer OCU loses communication with the trainee OCU for a predetermined timeout period.

In some cases, the system can command a full brake application if the trainer OCU and the trainee OCU that the trainer is monitoring become more than a threshold distance (e.g., one hundred feet, etc.) apart. This penalty may not be instant, and a warning tone and/or countdown could occur on the OCUs in order to provide a reasonable time for the trainer and trainee to resolve the issue (e.g., move within one hundred feet, etc.). In these cases, the OCUs may each include a global navigation satellite system (GNSS) antenna (e.g., a GPS antenna, etc.) to determine a distance between the OCUs.

The trainer OCU may look similar to OCUs that are able to operate the locomotive, but the trainer OCU may not communicate directly to the locomotive remote control equipment. Instead, the trainer OCU can maintain a separate wireless link with a trainee OCU that is controlling the RCL for the purposes of monitoring the commands issued by a trainee. In this manner, two trainees can operate the locomotive while being monitored by the trainers that are job-shadowing them. As described above, the trainer would have the capability of overriding the trainee by commanding a locomotive emergency brake application if the trainer saw the trainee performing an unsafe action.

For example, the trainer OCU could display everything that the trainee OCU shows, but may not be capable of operating the locomotive. The trainer OCU may only be capable of overriding commands from the trainee OCU by sending the override command through an RF link between the trainer OCU and the trainee OCU, and the trainee OCU could then relay the command to the locomotive.

As described above, the trainee OCU may command a penalty brake application to the locomotive if the distance between trainer OCU and the trainee OCU exceeds a predefined limit. The distance could be measured by GPS coordinates (or other satellite navigation system coordinates) sourced from an on-board GPS receiver in the OCUs. The OCUs could post a warning to alert the trainer and trainee if the distance between the trainer and trainee OCUs approaches a specified (e.g., predefined) limit. In some cases, the trainer OCU could have tilt protection that would relay a penalty message to the trainee OCU if the trainer OCU exceeds the tilt timeout period.

In some embodiments, the trainer OCU would be paired to the trainee OCU after the trainee OCU is assigned to the locomotive. The RF link between the trainer OCU and the trainee OCU would be separate from the RF link that is used by the trainee OCU to communicate with the locomotive.

With reference to the figures, FIG. 1 illustrates an example remote control locomotive training system 100 according to some aspects of the present disclosure. The system 100 includes a locomotive control unit 102 coupled to a locomotive 104. The locomotive control unit 102 is configured to control operation of the locomotive 104, and may include any suitable locomotive control unit (e.g., machine control unit, etc.) as described herein.

The system 100 also includes a trainee operator control unit 106 in wireless communication with the locomotive control unit 102. The trainee operator control unit 106 includes a first wireless interface 108 configured to transmit one or more commands to the locomotive control unit 102. For example, as described herein, the trainee operator control unit 106 may receive commands from a trainee operator 110, and transmit the commands to the locomotive control unit 102 to control the locomotive 104.

As shown in FIG. 1, the system 100 further includes a trainer operator control unit 112. The trainer operator control unit 112 is in wireless communication with the trainee operator control unit 106 via a second wireless interface 114 of the trainee operator control unit 106.

The trainer operator control unit 112 is configured to monitor the trainee operator control unit 106 by receiving messages from the trainee operator control unit 106 indicative of the one or more commands transmitted from the trainee operator control unit 106 to the locomotive control unit 102. Therefore, a trainer operator 116 can monitor the trainee operator 110. For example, the trainer operator control unit 112 may be configured to display the same information that is displayed on a display screen of the trainee operator control unit 106.

In some embodiments, the trainer operator control unit 112 may not be in wireless communication with the locomotive control unit 102. For example, the trainer operator control unit 112 may be in wireless communication with only the trainee operator control unit 106.

As described above, the trainee operator control unit 106 includes a first wireless interface 108 and a second wireless interface 114. The first wireless interface 108 may be separate from the second wireless interface 114, and may operate according to a different wireless communication protocol.

For example, the first wireless interface 108 may be a radio frequency (RF) wireless interface for establishing an RF communication channel between the trainee operator control unit 106 and the locomotive control unit 102. The second wireless interface 114 may be a Wi-Fi wireless interface for establishing an RF communication channel between trainee operator control unit 106 and the trainer operator control unit 112. Therefore, the trainee operator control unit 106 may communicate with the locomotive control unit 102 and the trainer operator control unit 112 via separate wireless communication channels.

In some embodiments, the trainer operator control unit 112 may be configured to transmit an emergency brake application override command to the trainee operator control unit 106. In that case, the trainee operator control unit 106 is configured to relay the emergency brake application override command to the locomotive control unit 102.

For example, the emergency brake application override command can allow the trainer operator 116 to stop operation of the locomotive 104 via the trainee operator control unit 106 if the trainer operator 116 determines that the trainee operator 110 is performing an unsafe operation, etc.

The trainer operator control unit 112 may not be able to communicate with the locomotive control unit 102 directly, and may not be able to control the locomotive control unit 102 in any manner other than issuing the emergency brake application override command via the trainee operator control unit 106.

In some embodiments, the trainee operator control unit 106 may be configured to transmit a brake application override command (e.g., penalty brake application) to the locomotive control unit 102 when a distance (D in FIG. 1) between the trainer operator control unit 112 and the trainee operator control unit 106 exceeds a threshold distance for a specified threshold duration of time.

For example, if the trainer operator control unit 112 and trainee operator control unit 106 exceed a separation distance that may affect the quality of wireless signal transmission between the trainer operator control unit 112 and trainee operator control unit 106 for a specified amount of time (e.g., thirty seconds, one minute, etc.), the trainee operator control unit 106 may automatically transmit the brake application override command to the locomotive control unit 102. In some cases, system brake events such as a timeout between the operator control units, an exceeded distance between the operator control units, etc., may have a lower severity brake application than the emergency override brake application command from the trainer operator control unit 112.

In some embodiments, the trainer operator control unit 112 and/or the trainee operator control unit 106 may be configured to display a warning when the distance between the trainer operator control unit 112 and the trainee operator control unit 106 approaches the threshold distance. This can give the trainer operator 116 and/or the trainee operator 110 an opportunity to return to a safe distance to continue operating the locomotive 104.

The trainer operator control unit 112 may include one or more tilt sensing devices. In that case, the trainer operator control unit 112 can be configured to transmit the brake application command to the trainee operator control unit 106 when the tilt sensor detects a tilt event for a specified tilt duration of time (e.g., five seconds, thirty seconds, one minute, etc.).

For example, if the trainer operator 116 falls down and the tilt sensor detects the tilt event for the specified duration of time, the trainer operator control unit 112 transmits the brake application command to the trainee operator control unit 106 because the trainer operator 116 is no longer able to monitor the trainee operator 110.

In some embodiments, the trainer operator control unit 112 is configured to establish a paired wireless connection via the second wireless interface 114 of the trainee operator control unit 106 after the trainee operator control unit 106 has paired with the locomotive control unit 102 via the first wireless interface 108. Therefore, the trainee operator control unit 106 may pair with the locomotive control unit 102 before pairing with the trainer operator control unit 112.

Figure 2:
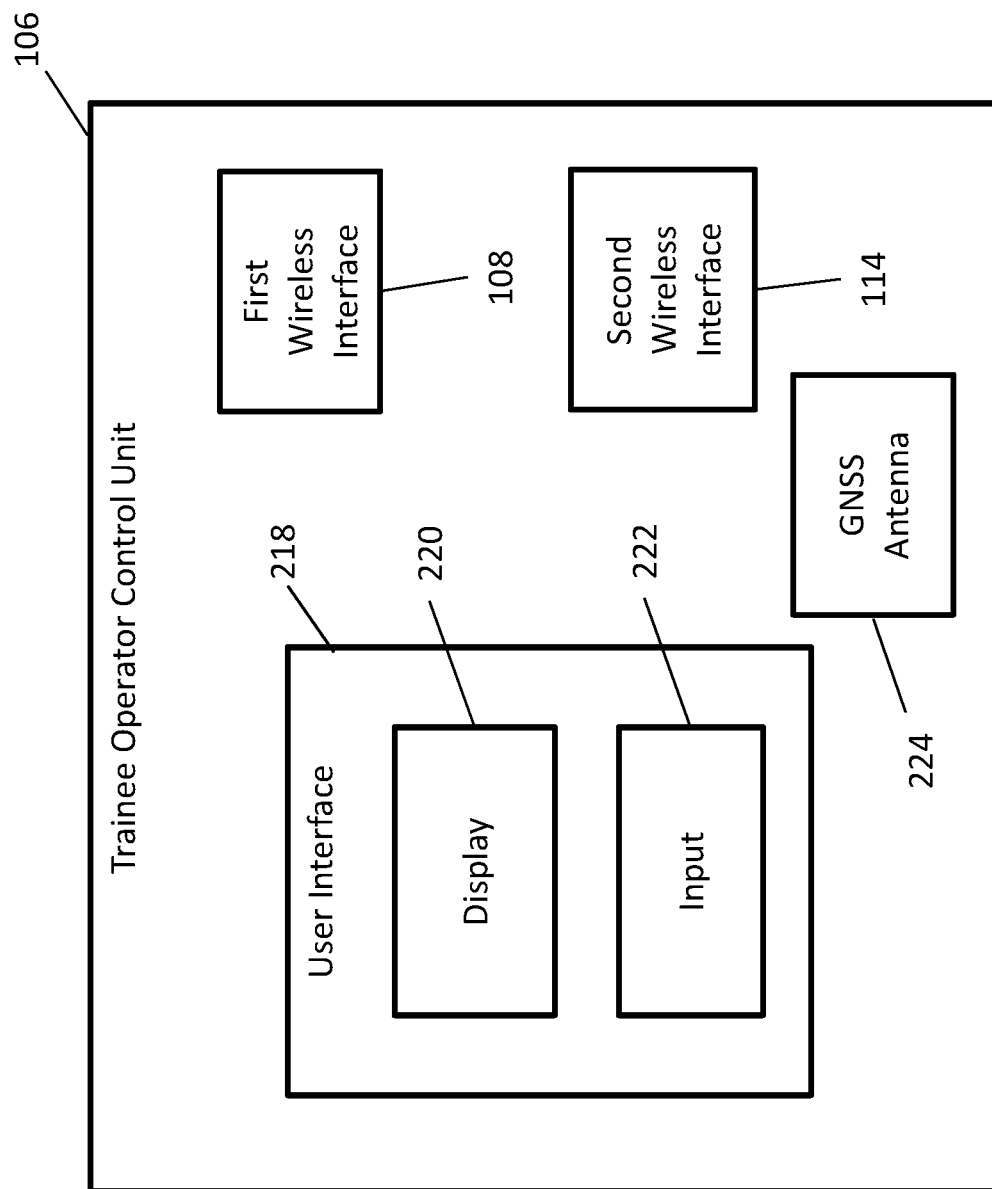
FIG. 2 is a block diagram of the example trainee operator control unit shown in FIG. 1.

FIG. 2 illustrates a block diagram of the trainee operator control unit 106 shown in FIG. 1. The trainee operator control unit 106 includes a user interface 218 for receiving input (e.g., commands, etc.) from an operator. The user interface may include a display 220, which can be any suitable display (e.g., a liquid crystal display (LCD), light emitting diodes (LED), indicator lights, etc.). The user interface may include an input 222, which can include any suitable input element(s) (e.g., a keypad, touchscreen, switches, etc.).

As described above, the trainee operator control unit 106 also includes first and second wireless interfaces 108 and 114. The wireless interfaces 108 and 114 may communicate with the respective locomotive control unit 102 and trainer operator control unit 112 using any suitable wireless communication protocol (e.g., an RF channel, a Wi-Fi connection, etc.). The trainee operator control unit 106 may include a global navigation satellite system (GNSS) antenna 224 for determining a location of the trainee operator control unit 106. For example, the GNSS antenna 224 may be a global positioning system (GPS) antenna.

Figure 3:
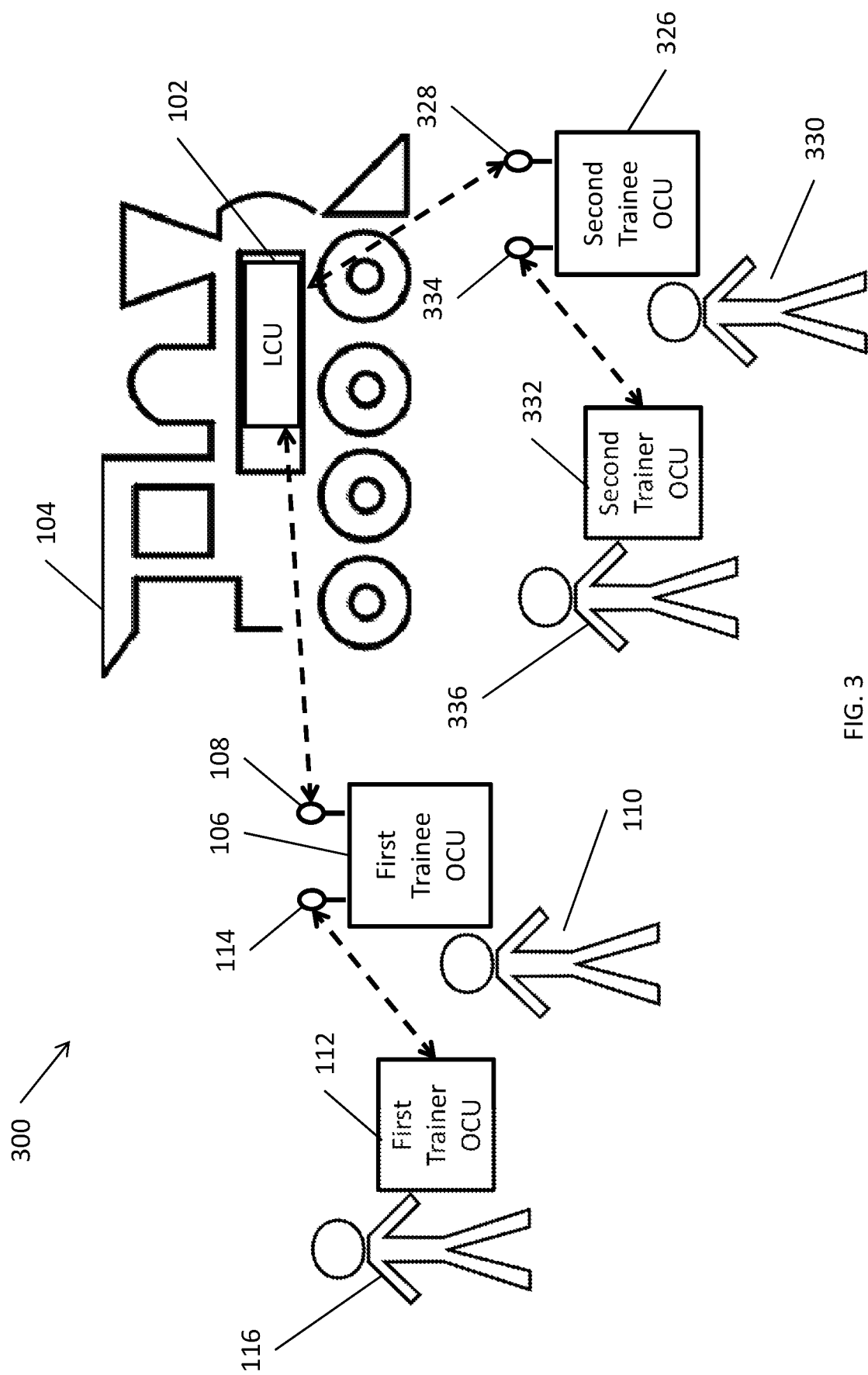
FIG. 3 is a block diagram of the system of FIG. 1 including a second trainee operator control unit and a second trainer operator control unit.

FIG. 3 illustrates an example system 300 according to another example embodiment of the present disclosure. The system 300 is similar to the system 100 of FIG. 1, but further includes a second trainee operator control unit 326 and a second trainer operator control unit 332.

The second trainee operator control unit 326 is in wireless communication with the locomotive control unit 102 via a first wireless interface 328 of the second trainee operator control unit 326, and the second trainee operator control unit 326 is in wireless communication with the second trainer operator control unit 332 via a second wireless interface 334 of the second trainee operator control unit 326. This allows a second trainer operator 336 to monitor a second trainee operator 330.

In some embodiments, a trainer OCU may be similar to a trainee OCU, but the trainer OCU does not include a wireless radio that communicates with a remote control locomotive. Therefore, the trainer OCU may be universal for multiple (e.g., all) RF protocols. The trainer OCU could have a visual indication (e.g., a different membrane) to make it clear that the trainer OCU it is not a production OCU that is capable of operating a locomotive directly.

One example process for pairing a trainer OCU with a trainee OCU is described below. After a trainee OCU completes an assignment (e.g., an infrared (IR) assignment, etc.) to a LCU, a time window (e.g., a two-minute window, etc.) of pairing opportunity may open. While this time window of opportunity is open, the trainee OCU may have an option available in a menu of the trainee OCU to pair with a trainer OCU. This menu option may be hidden after this time window of opportunity closes.

The time window of opportunity could be opened following a power-up (which may occur after a successful OCU assignment). The trainer and trainee OCUs may be linked to one another until the trainee OCU is assigned to another locomotive system, the assignment is cleared from the trainee and/or trainer OCU, etc.

If a menu option is exercised, the trainee OCU display can prompt a user to have the trainer OCU powered up in IR assignment mode and to align IR windows between the trainee OCU and the potential Trainer OCU. Alternatively, or in addition, the pairing could occur via BLUETOOTH. If BLUETOOTH is used to perform the pairing, a method of confirmation that the intended devices are being paired may be used to distinguish between multiple OCUs in the locomotive cab.

If pairing is successful, the two OCUs can exchange information to create a network exclusively between the trainer and trainee OCUs via a Wi-Fi radio. If alignment and data transfer does not complete successfully, the OCU display will alert the user and extend the window of opportunity to attempt a retry of the pairing process. Pairing between the trainer and trainee OCUs can be cancelled if either OCU assignment information changes.

Once paired, the trainer OCU can maintain Wi-Fi communication with the trainee OCU by sending data in a Wi-Fi poll to the trainee OCU. The data may include one or more status flags for, e.g., a tilt fault, a location warning, etc. A sequence number or code may be forwarded by a master processor, the number or code may change with each assignment or each poll, and the number or code may be decoded by the trainee master processor for the message to be considered valid.

The trainer OCU can display a copy of LED(s), LCD(s), etc. of the trainee OCU to which it is paired. Some data may come from an LCU online poll that is forwarded from the trainee OCU through the Wi-Fi link. The state of the current OCU switches may be forwarded through the Wi-Fi link from the trainee OCU and not from the forwarded poll.

The trainer OCU can calculate a distance between the trainee and trainer OCUs based on its own GPS coordinates and the trainee OCU GPS coordinates that are forwarded from the trainee OCU. If the calculated distance exceeds a specified distance (e.g., one hundred feet, etc.), the location warning bit can be set and the trainer OCU can start a location warning indication. In some embodiments, the trainee could perform verification (e.g., redundantly) based on GPS coordinates obtained from the trainer OCU.

The trainer OCU may have the ability to override the active trainee OCU for emergency brake application using an independent brake override, tilt override, etc. In these cases, the trainee OCU may be required to forward the overridden data to the LCU through online or offline polls.

Once paired, the trainee OCU may maintain Wi-Fi communication with the trainer OCU by sending data in response to trainer OCU polls. The data may include an online poll received from the LCU, current switch selections of the trainee OCU (intended to help teach certain features where the talkback message does not indicate the switch settings such as pitch and catch procedures), GPS coordinates of the trainee OCU, a sequence number or code that is forwarded by a master processor, etc.

The trainee OCU may function normally other than the communication to the trainer OCU. If the OCU sends an emergency override, the trainee OCU forwards this data to the LCU. If the trainee OCU receives a message from the trainer OCU indicating a location warning event, the location warning indication starts.

As described herein, the example trainer and trainee operator control units may include a microprocessor, microcontroller, integrated circuit, digital signal processor, etc., which may include memory. The operator control units may be configured to perform (e.g., operable to perform, etc.) any of the example processes described herein using any suitable hardware and/or software implementation. For example, the operator control units may execute computer-executable instructions stored in a memory, may include one or more logic gates, control circuitry, etc.

According to another example embodiment, a trainee operator control unit for a locomotive includes a user interface configured to receive one or more commands from an operator for controlling a locomotive, and a first wireless interface configured to transmit the one or more commands to a locomotive control unit of a locomotive.

The trainee operator control unit also includes a second wireless interface configured to transmit messages to a trainer operator control unit. The messages are indicative of the one or more commands transmitted from the trainee operator control unit to the locomotive control unit to allow the trainer operator control unit to monitor the trainee operator control unit.

The trainee operator control unit may be configured to receive an emergency brake application override command from the trainer operator control unit via the second wireless interface, and to relay the emergency brake application override command to the locomotive control unit via the first wireless interface. In some cases, the trainee operator control unit can be configured to transmit a brake application override command to the locomotive control unit when a distance between the trainer operator control unit and the trainee operator control unit exceeds a threshold distance for a specified threshold duration of time.

According to a further example embodiment, a remote control locomotive training system includes a locomotive control unit coupled to a locomotive and configured to control operation of the locomotive, and a trainer operator control unit in wireless communication with the locomotive control unit via a first wireless interface.

The system also includes a trainee operator control unit in wireless communication with the trainer operator control unit via a second wireless interface of the trainer operator control unit. For example, the trainer operator control unit may be linked with the trainee operator control unit via a Wi-Fi connection, and linked with the locomotive control unit via an RF connection.

The trainee operator control unit is configured to receive one or more commands from an operator for controlling a locomotive, and transmit the received one or more commands to the trainer operator control unit. The trainer operator control unit is configured to monitor the one or more commands and to relay the one or more commands to the locomotive control unit.

In some embodiments, the trainer operator control unit is configured to receive a brake application override command from a user interface of the trainer operator control unit, and to transmit the brake application override command to the locomotive control unit via the first wireless interface.

The trainer operator control unit may be configured to transmit a penalty brake application command to the locomotive control unit when a distance between the trainer operator control unit and the trainee operator control unit exceeds a threshold distance for a specified threshold duration of time.

According to another example embodiment, an exemplary method for remote control locomotive training is disclosed. The exemplary method generally includes controlling operation of a locomotive via a locomotive control unit coupled to the locomotive, and wirelessly transmitting one or more commands from a trainee operator control unit to the locomotive control unit via a first wireless interface of the trainee operator control unit.

The method also includes monitoring the trainee operator control unit using a trainer operator control unit in wireless communication with the trainee operator control unit via a second wireless interface of the trainee operator control unit, by receiving messages from the trainee operator control unit indicative of the one or more commands transmitted from the trainee operator control unit to the locomotive control unit. The trainer operator control unit may be in wireless communication with only the trainee operator control unit.

In some embodiments, the trainee operator control unit is a first operator control unit and the trainer operator control unit is a first operator control unit. In those cases, the method further includes wirelessly transmitting one or more commands from a second trainee operator control unit to the locomotive control unit via a first wireless interface of the second trainee operator control unit, and monitoring the second trainee operator control unit using a second trainer operator control unit in wireless communication with the second trainee operator control unit via a second wireless interface of the second trainee operator control unit, by receiving messages from the second trainee operator control unit indicative of the one or more commands transmitted from the second trainee operator control unit to the locomotive control unit.

The method may include transmitting an emergency brake application override command from the trainer operator control unit to the trainee operator control unit, and relaying the emergency brake application override command from the trainee operator control unit to the locomotive control unit. In some cases, the method may include transmitting a brake application override command to the locomotive control unit when a distance between the trainee control unit and the trainer operator control unit exceeds a threshold distance for a specified threshold duration of time.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
   a trainee operator control unit configured for wireless communication with a locomotive control unit for transmitting one or more commands to the locomotive control unit; and
   a trainer operator control unit configured for wireless communication with the trainee operator control unit, the trainer operator control unit configured to monitor the trainee operator control unit by receiving messages from the trainee operator control unit indicative of the one or more commands transmitted from the trainee operator control unit to the locomotive control unit;
   wherein the trainer operator control unit is configured to transmit a brake application override command to the trainee operator control unit, and the trainee operator control unit is configured to relay the brake application override command and/or a stop command to the locomotive control unit.

2. The system of claim 1, wherein:
   the trainee operator control unit includes a first wireless interface for transmitting one or more commands to the locomotive control unit, and a second wireless interface; and
   the trainer operator control unit is configured for wireless communication with the trainee operator control unit via the second wireless interface of the trainee operator control unit.

3. The system of claim 2, wherein the trainer operator control unit is configured to establish a paired wireless connection with the trainee operator control unit via the second wireless interface of the trainee operator control unit, after the trainee operator control unit has paired with the locomotive control unit via the first wireless interface.

4. The system of claim 1, wherein the trainee operator control unit includes:
   a radio frequency wireless interface for transmitting one or more commands to the locomotive control unit; and
   a Wi-Fi wireless interface for wireless communication with the trainer operator control unit.

5. The system of claim 1, wherein the trainer operator control unit is configured for wireless communication with only the trainee operator control unit, and/or wherein the trainer operator control unit is not configured for wireless communication with the locomotive control unit.

6. The system of claim 1, wherein:
   the trainee operator control unit is a first trainee operator control unit;
   the trainer operator control unit is a first trainer operator control unit; and
   the system further comprises a second trainee operator control unit and a second trainer operator control unit.

7. The system of claim 6, wherein:
   the first trainee operator control unit is configured for wireless communication with the locomotive control unit via a first wireless interface of the first trainee operator control unit; and
   the first trainer operator control unit is configured for wireless communication with the first trainee operator control unit via a second wireless interface of the first trainee operator control unit;
   the second trainee operator control unit is configured for wireless communication with the locomotive control unit via a first wireless interface of the second trainee operator control unit; and
   the second trainer operator control unit is configured for wireless communication with the second trainee operator control unit via a second wireless interface of the second trainee operator control unit.

8. The system of claim 1, wherein the trainer operator control unit is configured to transmit the brake application override command and/or stop command when a distance between the trainer operator control unit and the trainee operator control unit exceeds a threshold distance for a specified threshold duration of time.

9. The system of claim 8, wherein the trainer operator control unit and the trainee operator control unit are each configured to display a warning when the distance between the trainer operator control unit and the trainee operator control unit approaches the threshold distance.

10. The system of claim 1, wherein the trainer operator control unit includes at least one tilt sensor, and the trainer operator control unit is configured to transmit the brake application override command to the trainee operator control unit when the at least one tilt sensor detects a tilt event for a specified tilt duration of time.

11. The system of claim 1, wherein the trainer operator control unit is configured to display the same information that is displayed on a display screen of the trainee operator control unit.

12. The system of claim 1, wherein the system further includes the locomotive control unit that is coupled to a locomotive and configured to control operation of the locomotive.

13. A system comprising:
    a trainer operator control unit configured for wireless communication with a locomotive control unit; and a trainee operator control unit configured for wireless communication with the trainer operator control unit, the trainee operator control unit configured to receive one or more commands for controlling a locomotive and transmit the received one or more commands to the trainer operator control unit, the trainer operator control unit configured to monitor for the one or more commands transmitted to the locomotive control unit from the trainee operator control unit;

wherein the trainer operator control unit is configured to transmit a brake application override command to the trainee operator control unit; and wherein the trainee operator control unit is configured to receive the brake application override command from the trainer operator control unit, and to transmit the brake application override command to the locomotive control unit.

14. The system of claim 13, wherein:

the trainer operator control unit is configured for wireless communication with the locomotive control unit via a first wireless interface of the trainer operator control unit; and the trainee operator control unit is configured for wireless communication with the trainer operator control unit via a second wireless interface of the trainer operator control unit.

15. The system of claim 13, wherein the trainer operator control unit is configured to transmit a penalty brake application command when a distance between the trainer operator control unit and the trainee operator control unit exceeds a threshold distance for a specified threshold duration of time.

16. The system of claim 13, wherein the trainer operator control unit and the trainee operator control unit are each configured to display a warning when a distance between the trainer operator control unit and the trainee operator control unit approaches a threshold distance.

17. The system of claim 13, wherein the trainer operator control unit includes at least one tilt sensor, and the trainer operator control unit is configured to transmit the brake application override command to the trainee operator control unit when the at least one tilt sensor detects a tilt event for a specified tilt duration of time.

18. The system of claim 1, wherein the trainer operator control unit is configured to display the same information that is displayed on a display screen of the trainee operator control unit.

19. The system of claim 13, wherein the system further includes the locomotive control unit that is coupled to a locomotive and configured to control operation of the locomotive.

20. A trainee operator control unit comprising a first wireless interface and a second wireless interface, wherein:

the trainee operator control unit is configured for wireless communication with a locomotive control unit via the first wireless interface for transmitting one or more commands to the locomotive control unit;

the trainee operator control unit is configured for wireless communication with a trainer operator control unit via the second wireless interface, the trainer operator control unit configured to transmit a brake application override command to the trainee operator control unit; and wherein the trainee operator control unit is configured for receiving the brake application override command from the trainer operator control unit via the second wireless interface, and for transmitting the brake application override command to the locomotive control unit via the first wireless interface.

* * * * *